July 28, 1964
P. ANTOKAL ETAL
3,142,630
SURFACE AND INTERIOR MODIFICATION OF
THERMOPLASTIC RESINOUS BODIES
Filed July 27, 1960
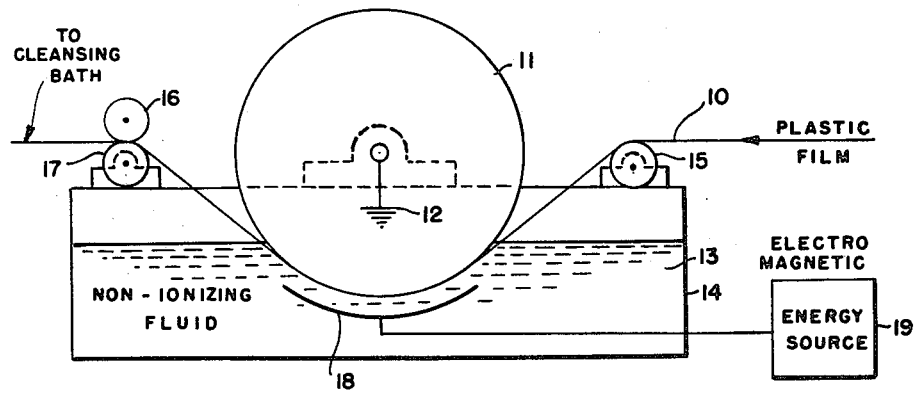
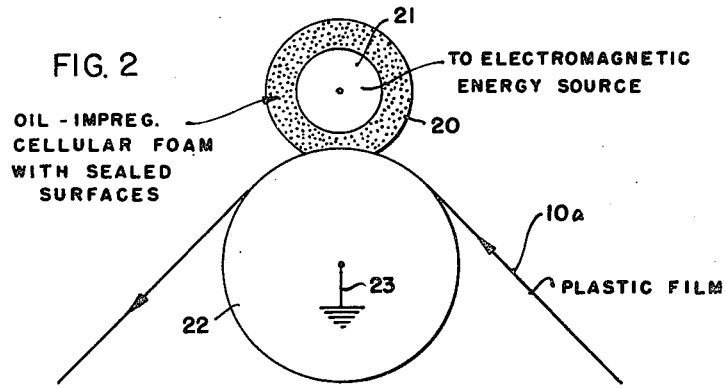
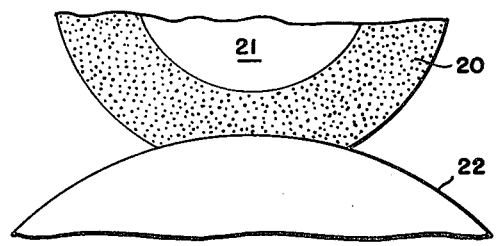
INVENTORS:
PHILIP ANTOKAL
MATHEW F. KRITCHEVER
BY
Dawson, Tilton, Fallon & Lungmus
ATT'YS United States Patent Office 3,142,630
Patented July 28, 1964

3,142,630
SURFACE AND INTERIOR MODIFICATION OF THERMOPLASTIC RESINOUS BODIES
Philip Antokal, Chicago, and Mathew F. Kritchever, Glencoe, Ill., assignors, by mesne assignments, to E. I. du Pont de Nemours and Company, Wilmington, Del., a corporation of Delaware
Filed July 27, 1960, Ser. No. 45,759
2 Claims. (Cl. 204—162)

This invention relates to surface and interior modification of thermoplastic resinous bodies, and is particularly useful in the treatment of resin plastics which are normally non-adherent or only slightly adherent to inks, adhesives, and other coatings. The invention is particularly useful in the treatment of such substantially non-adherent plastics as polyethylene and polypropylene, but is also useful in the treatment of polyvinyl chloride, polyvinylidene chloride, and copolymers, homologues, and mixtures thereof.

An object of the present invention is to provide a process and apparatus for the treatment of such resin plastics which are substantially non-adherent to inks, adhesives, and other coatings to render the same adherent. A further object is to provide such a process which does not produce ionization of the intervening air or other media between the treating electrodes, thus avoiding the formation of ozone and corrosive substances. Yet another object is to provide simple means and process steps for forming within the interior and on the surface of the thermoplastic resinous bodies, physical changes that result in the tenacious adherence of polymeric coatings, such as inks, adhesives, or coatings which polymerize or partially polymerize upon exposure to air or under gentle heating conditions. Other specific objects and advantages will appear as the specification proceeds.

The invention is shown in an illustrative embodiment in the accompanying drawing in which FIG. 1 is a diagrammatic view of apparatus which may be employed in the practice of the invention; FIG. 2, a view similar to FIG. 1 but showing a modified form of apparatus; and FIG. 3, an enlarged broken detail view showing a section of the structure in FIG. 2.

In one embodiment of our invention, we impinge upon a thermoplastic resin body which is to be treated, a photon discharge generated at ultra high frequency for the forming on the body and in the interior of the body double bonds for retaining a polymeric coating. For example, we impinge upon the body a photon discharge generated in the range of ½ to 30 megacycles, operating in the range of 3,500 to 50,000 volts at about 100 milliamps output.

In the illustration given in FIG. 1, a plastic film 10 is drawn about a roll 11 which is grounded at 12 and which is partially immersed in a non-ionizing fluid 13 carried by the container 14. The film is carried over a guide roll 15, and on leaving the fluid is passed between squeeze rolls 16 and 17 to remove the excess fluid, and from thence the plastic is passed to a cleansing bath for removal of any remaining fluid. The non-ionizing fluid may be a transformer coolant oil, vegetable oil, or any oil suitably free of impurities so as to be effectively non-conductive. An electrode 18 is supported within the container 14 at a spaced distance below the roll 11 and is energized by any electromagnetic energy source indicated by the numeral 19. The energy source may be a high frequency generator of either electronic or spark-gap type of suitable size and capacity to correlate with width and speed of the material being processed.

In operation, the film 10 is drawn over guide roll 15 into fluid 13 while being supported by roll 11, with a photon projection taking place between the energized electrode 18 and roll 11, and thereafter out of the fluid through the squeeze rolls 16 and 17, and thence to a suitable cleansing bath.

To avoid contact between the plastic film and the fluid, we provide in FIG. 2 apparatus in which the oil or other non-ionizing fluid is sealed within a cellular foam roll 20 enclosing a rotary electrode 21 which is connected to an electromagnetic energy source. The cellular body 20 may be made of polyurethane formed with a skin or enclosed within an oil-impervious skin. The roll 20 may also be formed of Neoprene film or any other dielectric material which resists the chemical action of the fluid contained therein. A driven roll 22 grounded at 23 carries the plastic film 10a. As shown more clearly in FIG. 3, the rotary electrode 21 is spaced at such a distance from grounded support roll 22 that the foam cellular structure 20 is substantially compressed. The purpose of the compression shown in FIG. 3 is to provide an increased dielectric path for the electromagnetic energy to traverse beyond the normal short path it would take through the dielectric to the ground roll 22. This results in the prevention of corona formation in the contact of the rolls.

The gap or spacing between the electrode and the film or plastic body may be varied under different conditions. For example, in the structure shown in FIG. 1, a gap distance of about 1/16 inch is found to be very satisfactory. If the fluid 13 be omitted so that the space between the electrode 18 and the film 10 is air, we prefer a gap of about ¾ inch. In the latter operation, while the treatment is comparable, the permissible speed of the film 10 is greatly reduced. In this operation, as contrasted with the operation in which the non-ionizing fluid is employed, there is no ionization of the intervening air and there is no corona.

While in the case where a non-ionizing fluid, such as transformer coolant oil, is employed, we prefer to use a gap of about 1/16 inch, the gap or distance may be varied.

Additional specific examples of the foregoing process may be set out as follows:

*Example I*

In the apparatus of FIG. 1, film was traveled at the rate of 150 feet per minute over a support roll, subjected to electromagnetic energy discharge generated at 27 megacycles, 10,000 volts, at 100 milliamp output, with a gap of 1/16 inch. Upon removal of residual oil, a conventional printing ink was applied and allowed to dry, and thereafter tested for adhesion. The adhesion was found to be very firm, and the material could not be removed by the conventional Scotch tape test.

*Example II*

In the apparatus of FIG. 2, polyethylene film was moved over a support roll at the rate of 60 feet per minute while subjected to electromagnetic discharge generated at 27 megacycles, 10,000 volts, at 100 milliamp output. The thickness of the foam envelope 20 was ⅛" uncompressed and 1/16 inch when compressed, and was impregnated with transformer coolant oil. Following the passage of the film through the apparatus, a conventional Flexograph printing ink was applied to the treated surface and allowed to dry. When tested with the conventional Scotch tape adhesion test, it was found that no ink could be removed. In addition to the testing of the treated film with ink, a water-soluble animal glue was applied to the material and was found to adhere upon drying. To another portion of the treated film was applied a solvent dispersion of polyvinyl chloride, which when allowed to dry showed complete resistance to removal by a severe Scotch tape test.

Example III

In the apparatus of FIG. 1, except that fluid 13 was omitted, film was passed over a supporting grounded electrode 11 at the rate of two feet per hour. Electrode 18 was energized by an electron generator operating at 27 megacycles, 10,000 volts, and at 20 milliamps output, with a gap between the supported plastic film and electrode 18 of ¾ inch. The film so treated was coated with a conventional Flexographic ink and upon drying was tested with Scotch tape for adhesion and was found to have substantial adhesion of the ink to the treated surface.

While in the foregoing specification, we have set forth proposed steps and apparatus in considerable detail for the purpose of illustrating the invention, it will be understood that such details may be varied widely by those skilled in the art without departing from the spirit of our invention.

We claim:

1. In a process for treating a thermoplastic resin body which is substantially non-adherent to polymeric coatings to render it adherent to the same, the steps of directing upon said thermoplastic body photon energy generated at a frequency within the range of from 0.5 to 30 megacycles per second and under a voltage in the range of 3,500 to 50,000 volts whereby to form double bonds in said body for retaining a polymeric coating, said discharge being through a non-ionizing liquid.

2. The process of claim 1 in which the discharge is through a distance of about 1/16 inch.

References Cited in the file of this patent

UNITED STATES PATENTS

| | | |
|---|---|---|
| 2,844,731 | Plonsky et al. | July 22, 1958 |
| 2,864,755 | Rothacker | Dec. 16, 1958 |
| 2,939,956 | Parks | June 7, 1960 |
| 3,057,795 | Frohlich | Oct. 9, 1962 |

FOREIGN PATENTS

| | | |
|---|---|---|
| 227,222 | Australia | Aug. 14, 1958 |
| 842,104 | Great Britain | July 20, 1960 |

OTHER REFERENCES

Modern Plastics, July 1959, pages 101, 102, 105, 108, 109 and 160.